June 25, 1935. E. R. POWELL Re. 19,627

PROCESS OF MAKING FELTED MINERAL FIBER

Original Filed Aug. 24, 1928

INVENTOR.
Edward R. Powell
BY D. N. Halstead.
ATTORNEY.

Reissued June 25, 1935

Re. 19,627

UNITED STATES PATENT OFFICE 19,627

PROCESS OF MAKING FELTED MINERAL FIBER

Edward R. Powell, Alexandria, Ind., assignor, by mesne assignments, to Johns-Manville Products Corporation, New York, N. Y., a corporation of Delaware Original No. 1,899,056, dated February 28, 1933, Serial No. 301,850, August 24, 1928. Application for reissue February 27, 1935, Serial No. 8,511

23 Claims. (Cl. 154—28)

This invention relates to an essentially, automatically fabricated insulating product.

This application discloses certain of the subject matter disclosed in Powell Patent No. 1,948,395, filed January 16, 1928, said patent being a divisional of Powell Patent 1,656,828, filed January 5, 1927, and constitutes a continuation in part of said divisional application.

The chief object of this invention is to manufacture a felted fabric by an automatic process and, through the use of a suitable binder material for causing adhesion of the fiber material, form a product that can be readily handled in block or sheet form, as desired.

One of the chief features of the invention is the automatic production of a flexible, waterproof felt.

Another feature of the invention is the production of a relatively rigid waterproof felt,—the degree of flexibility or rigidity being determined by the character of the binder employed and the method of treating the same.

Another feature of the invention consists in the formation of a felted strip or sheet suitable for coating on one or both sides and suitable for subsequent assembly into a laminated structure.

Figure 1:
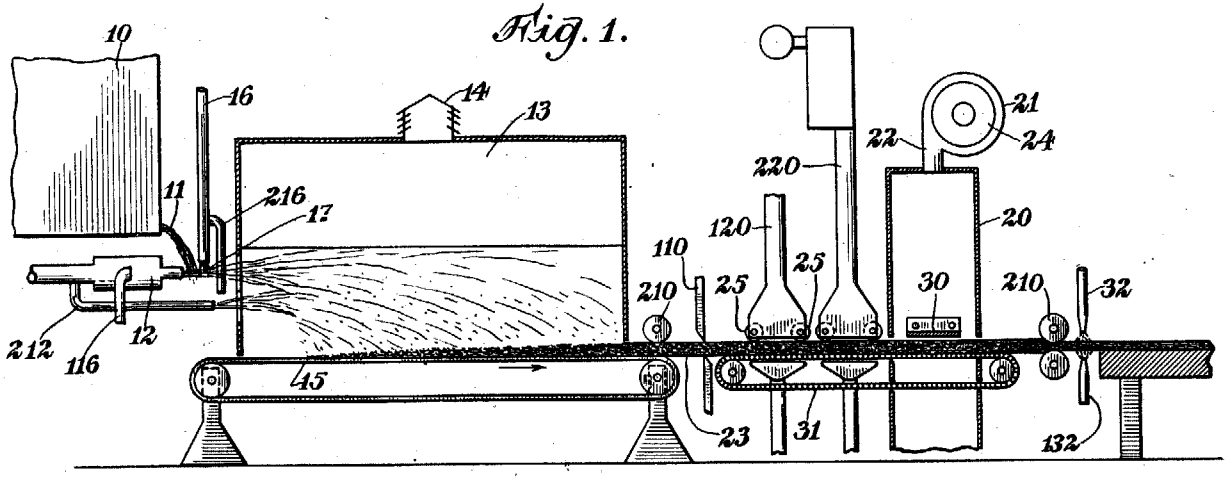
Figure 3:
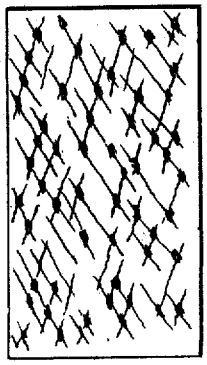
Figure 2:
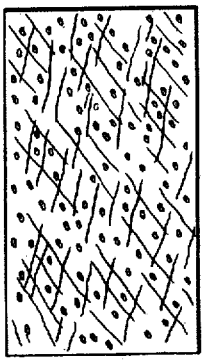
Figure 4:
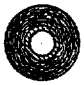

The full nature of the invention will be understood from the accompanying drawing and the following description and claims:

In the drawing, Fig. 1 is a digrammatic side elevation of an apparatus suitable for performing the process and producing the products. Fig. 2 is an enlarged plan view of a portion of the material produced by the first step of the process. Fig. 3 is a similar view of the material when completed. Fig. 4 is a side elevation of material in pipe covering formation.

In the drawing, 10 indicates a furnace having a molten stream discharge 11 which is of a character to produce a fiber such as commonly known as mineral wool. This fiber is produced by a steam-blowing nozzle 12 discharging the fiber and steam as well as air into a conveyor-type blow chamber 13, which vents the steam and air as at 14 and deposits the fiber on an endless conveyor 15.

There is incorporated in the fiber a suitable binder and one way of supplying this binder is to apply it in liquid form in a stream just beyond the stream of molten rock. A supply pipe 16 has a discharge portion as indicated, and the binder is shown dropping therefrom as at 17. The steam jet carries both the liquids,—that is, the molten rock 11 and the binder 17,—and diffuses them together thereby forming a suspension of the mineral fibers admixed with the finely divided binding material in the gaseous atmosphere of the settling chamber. With this form of introduction and diffusion, a considerable part of the binder is present in the fiber mass when the successive increments thereof are deposited upon the belt and as droplets, see Fig. 2, and has relatively little fiber binding effect. A suitable binder is sodium silicate. Other binders that can be applied in this manner are linseed oil, waxes and asphaltic fluxes.

The invention contemplates intimately mixing a binder with fiber of mineral character and thereafter subjecting the fiber and binder to treatment to disperse the droplets or change the composition thereof, or both, and, when dispersed and/or changed, to harden the binder to obtain the binding action not obtainable by mere mixing.

The process contemplates hardening the binder (the binder specified being initially of a fluid to a semi-fluid consistency) without changing the composition of it, or hardens the binder by changing the composition, or hardens the binder by the addition of other materials added to it, such as passing suitable reacting gases or vapors through the binder and fibrous material to form the sheet or product having the desired stiffness, rigidity or toughness.

If linseed oil is the binder, hot air blown through it will first oxidize the oil which dries and hardens the same in the binding relation relative to the fibers. No further baking need then be employed to harden the sheet, although it may be employed if desired.

Silicate of soda hardens by evaporation, which may be hastened by the use of hot air.

Asphaltic fluxes harden by evaporation of the volatile content and by oxidation or reaction with air and are waterproofing in character.

The binder may be a mixture of the foregoing ingredients or other ingredients, if desired or preferred.

It will be noted, therefore, that all of these binders harden by the use of heat in the presence of air and also with the use of other suitable gases and vapors, which may be especially adapted to react with the binder chosen.

The binder, preferably, should be applied in the form of a thin liquid, that is, one of low viscosity, but the binder should have the property of being easily hardened or toughened.

If the droplets shown in Fig. 2 consist of asphaltic fluxes or wax, the passing of hot air through the sheet in the continuous oven, as the sheet passes through the oven, will first melt the wax or asphaltic fluxes and disperse the same throughout the mass of fiber and tend to collect it along the junctions of the matted fibers as shown in Fig. 3. Continued application of heat drives off volatiles in the asphaltic fluxes or wax and permits the same to stiffen the sheet upon cooling.

Figs. 2 and 3 are greatly magnified and represent more or less ideal conditions for illustrating and explaining this invention. Fig. 2 illustrates the uniform manner in which the binding material is disseminated through the fibers of the matted material. However, it is the intention to describe a process in which these effects may take place to a much less extent than the idealized condition shown and yet be important enough to change the physical characteristics of the block.

The petroleum wax, silicate or linseed oil, or a mixture thereof, may be supplied by the pipes 116, 216 or 212 as desired or required and to the mineral wool discharged upon the conveyor 15. The felted strip upon said conveyor passes through the felting roll 210 for compacting the same and thence, if blocks are to be formed, through a suitable block-forming device such as the shears 110.

Strip 23 or the blocks, which may be similarly moved, then may be subjected to steam or other fluid in the hood 120 and the blocks or sheet will be carried through the hood construction by conveyor 31 which preferably is perforated for the passage of steam through said conveyor and the blocks or strip 23. Entrance and departure of the blocks from the hood 120 is sealed by the rollers 25.

Another hood 220 is provided also similarly sealed and associated with the perforated conveyor 31 and this is adapted to supply hot air passage through the block.

Another hood construction 20 having the blower connection 22, blower 21 and motor 24 is adapted to secure the passage of air through the conveyor and also through the strip or blocks 23, and in said blower housing is a baffle 30 for securing circuitous passage of the gas in the blower housing and, therefore, intimate contact with and penetration of the block. After the material in the block has been pressed or heat treated, it passes through the rolls 210 and, if desired, binder coatings jets 32 or 132 or both may be employed for coating one or both sides of the strip 23 to form a coated as well as felted air-tight block, and such a coated felted strip is suited as such to form a laminated product.

As previously suggested, the invention contemplates, if and when desired, the change of the shape of the block or unit by compressing or otherwise mechanically deforming prior to hardening, toughening and binding of the unit together by heating or oxidizing, etc.

An advantage is obtained by slightly rolling or otherwise compressing as by rolls 210 the fiber with the impregnated asphalt binder or the binder otherwise employed, since slight compression brings the fiber into slightly more intimate relationship or into better contact with the asphaltic ingredient or other constituent. This operation preferably should be employed while the material is in a heated condition or while the asphalt is in sticky condition. When the material subsequently cools and the asphalt, therefore, becomes solid, the desired binding effect is obtained.

This invention, therefore, contemplates the employment of a binder of the character set forth constituting any one of the ingredients or a mixture thereof and subjecting the same to any one or all of the gas treatments disclosed with reference to hoods or chambers 20, 120 and 220. Depression or compacting is indicated at 210, spraying for coating purposes or the like is indicated at 32 or 132 and, as a result, the invention includes the formation of a mineral fiber sheet, block or roll by what is commonly known as a relatively cold process. While this may seem a misnomer, since hot air or steam or other hot gases may be employed, it, nevertheless, is called and known as a cold process, for the present invention contemplates subjecting the material to only a temperature of from two hundred to two hundred and fifty degrees to form a more flexible material and from three hundred to three hundred and fifty degrees to form a stiffer felt. The probable percentage of organic material for the product is between twenty and thirty per cent.

The invention claimed is:

1. In a process for the manufacture of sheet material containing mineral fibers and a binder, the improvement which consists in forming a suspension of the fibers admixed with finely divided binding material in a gaseous atmosphere, depositing the suspended admixture in successive increments on a continuously moving surface until a layer or mat of a suitable thickness is formed having the binding material uniformly disseminated throughout the matted fibers, and withdrawing the matted material after the requisite thickness is attained from the deposition zone.

2. In a process for the manufacture of sheet material containing mineral fibers and a binder, the improvement which consists in forming a suspension of the fibers admixed with finely divided liquid binding material in a gaseous atmosphere, depositing the suspended admixture in successive increments on a moving support until a layer or mat of a suitable thickness is formed having the binding material uniformly disseminated throughout the matted fibers in the form of minute particles, and compacting the mat to distribute the minute particles of binder throughout the matted fibers.

3. In a process for the manufacture of sheet material containing mineral wool fibers and a binder, the improvement which consists in forming a suspension of the fibers admixed with finely divided binding material in a gaseous atmosphere, depositing the suspended admixture in successive increments on a moving support until a continuous layer or mat of a suitable thickness is formed having the binding material uniformly disseminated throughout the fibers in the form of minute particles and passing a current of gas through the mat to disperse the binder throughout the matted fibers.

4. In a process for the manufacture of a sheet material containing mineral fibers and a binder, the improvement which consists in forming a suspension of the fibers admixed with finely divided binding material in a gaseous atmosphere, depositing the suspended admixture in successive increments on a moving support until a layer or mat of a suitable thickness is formed having the binding material uniformly disseminated throughout the matted fibers and subjecting the matted material to treatment adapted to harden the binder.

5. In a process for the manufacture of sheet material containing mineral fibers and a binder, the improvement which consists in forming a suspension of the fibers admixed with finely divided binding material in a gaseous atmosphere, depositing the suspended admixture in successive increments on a moving support until a layer or mat of a suitable thickness is formed having the binding material uniformly disseminated throughout the matted fibers and subjecting the matted material to treatment adapted to disperse the binder throughout the fibers and harden said binder.

6. A process for the manufacture of sheet material which comprises forming a suspension of mineral fibers in a settling chamber by disintegrating a stream of a suitable molten mineral, spraying a binding material into the suspended fibers, depositing the suspended fibers and dispersed binding material simultaneously in the form of a layer or mat wherein the binding material is uniformly disseminated in the form of minute particles and blowing a current of gas through the mat adapted to disperse the particles of binding material throughout the fibers and harden said binding material.

7. A process for the manufacture of felted sheets of mineral wool which comprises forming a suspension of mineral wool by disintegrating a molten stream of a suitable mineral material, spraying a binding material into the suspended fibers, depositing successive increments of the suspended fibers and dispersed binding material simultaneously on to a moving surface in the form of a continuous mat, and compacting the mat thus formed into a coherent sheet.

8. A process for the manufacture of felted sheets of mineral wool which comprises forming a suspension of mineral wool by disintegrating a molten stream of a suitable mineral material, spraying a liquid binding material into the suspended fibers, depositing successive increments of the suspended fibers and dispersed binding material simultaneously on to a moving surface in the form of a continuous mat, and compacting the mat thus formed before hardening of the binder into a coherent sheet.

9. A process for the manufacture of felted sheets of mineral wool which comprises forming a suspension of mineral wool by disintegrating a molten stream of a suitable mineral material, spraying a binding material into the suspended fibers, depositing successive increments of the suspended fibres and dispersed binding material simultaneously on to a moving surface in the form of a continuous mat, compacting the mat thus formed into a coherent sheet and applying a coating material to the surface of the compacted sheet.

10. A process for the manufacture of felted sheets of mineral wool which comprises forming a suspension of mineral wool by disintegrating a molten stream of a suitable mineral material, depositing successive increments of the suspended fibers on to a moving surface in the form of a continuous mat, compacting the mat thus formed into a coherent sheet and applying a coating material to the surface of the compacted sheet.

11. In a process for the manufacture of sheet material containing mineral fibers and a binder, the improvement which consists in forming a suspension of the fibers admixed with finely divided binding material of a fluid to a semi-fluid consistency in a gaseous atmosphere, depositing the suspended admixture in successive increments on a continuously moving surface until a layer or mat of a suitable thickness is formed having the binding material uniformly disseminated throughout the matted fibers, and withdrawing the matted material after the requisite thickness is attained from the deposition zone.

12. In a process for the manufacture of sheet material containing mineral fibers and a binder, the improvement which consists in forming a suspension of the fibers admixed with finely divided binding material of a fluid to a semi-fluid consistency, in a gaseous atmosphere, depositing the suspended admixture in successive increments on a continuously moving surface until a layer or mat of a suitable thickness is formed having the binding material substantially uniformly disseminated throughout the matted fibers, withdrawing the matted material after the requisite thickness is attained from the deposition zone and compacting the mat thus formed into a coherent sheet.

13. In a process for the manufacture of sheet material containing mineral fibers and a binder, the improvement which consists in forming a suspension of the fibers admixed with finely divided binding material of a fluid to a semi-fluid consistency, in a gaseous atmosphere, depositing the suspended admixture in successive increments on a continuously moving surface until a layer or mat of a suitable thickness is formed having the binding material substantially uniformly disseminated throughout the matted fibers, withdrawing the matted material after the requisite thickness is attained from the deposition zone, compacting the mat thus formed into a coherent sheet, and subjecting the sheet material to a heat treatment adapted to harden the binder.

14. In a process for the manufacture of a sheet material containing mineral fibers and a binder, the improvement which consists in forming a suspension of the fibers admixed with finely divided binding material in a gaseous atmosphere, depositing the suspended admixture in successive increments on a moving support until a layer or mat of a suitable thickness is formed having the binding material uniformly disseminated throughout the matted fibers, and subjecting the matted material to the action of a fluid medium to cool and harden the binder.

15. In a process for the manufacture of a sheet material containing mineral fibers and a binder, the improvement which consists in forming a suspension of the fibers admixed with finely divided binding material in a gaseous atmosphere, depositing the suspended admixture in successive increments on a moving support until a layer or mat of a suitable thickness is formed having the binding material uniformly disseminated throughout the matted fibers, and subjecting the matted material to a current of air to cool and harden the binder.

16. In a process for the manufacture of a matted material containing mineral fibers and a binder, the improvement which consists in melting a mineral material, projecting the melted material into a chamber at high velocity to form fibers, collecting said fibers on a moving support to form a mat of suitable thickness, treating the fibers while hot with a binding material, and subjecting the matted material to the action of a fluid medium to stiffen and harden the binder.

17. In a process for the manufacture of a matted material containing mineral fibers and a binder, the improvement which consists in melting a mineral material, projecting the melted material into a chamber at high velocity to form fibers, collecting said fibers on a moving support to form a mat of suitable thickness, treating the fibers while hot with an organic binding material, and subjecting the matted material to the action of a fluid medium to stiffen and harden the binder.

18. In a process for the manufacture of matted material containing mineral fibers and a binder, the improvement which consists in melting a mineral material, projecting the melted material into a chamber at high velocity to form fibers, collecting said fibers on a moving support to form a mat of suitable thickness, treating the fibers while hot with a binding material, and subjecting the matted material to the action of heat and a fluid medium treatment to stiffen and harden the binder.

19. In a process for the manufacture of matted material containing mineral fibers and a binder, the improvement which consists in melting a mineral material, projecting the melted material into a chamber at high velocity to form fibers, collecting said fibers on a moving support to form a mass of suitable thickness, treating the fibers while hot with binding material, and subjecting the matted material to steam and air treatment to stiffen and harden the binder.

20. In a process for the manufacture of a sheet material containing mineral fibers and a binder, the improvement which consists in forming a suspension of fibers admixed with finely divided binding material having volatile contents in a gaseous atmosphere, depositing the suspended admixture in successive increments on a moving support until a layer or mat of suitable thickness is formed having a binding material uniformly disseminated throughout the matted fibers, and subjecting the matted material to the action of heat and a fluid medium treatment to stiffen and harden the binder.

21. In a process for the manufacture of a sheet material containing mineral fibers and a binder, the improvement which consists in forming a suspension of fibers admixed with a finely divided binding material including a water-mixed binder and a hydrocarbon in a gaseous mixture, depositing the suspended admixture in successive increments on a moving support until a layer or mat of suitable thickness is formed, subjecting the matted material to treatment for removing the water, and compacting the mat.

22. In a process for the manufacture of a sheet material containing mineral fibers and a binder, the improvement which consists in forming a suspension of fibers admixed with a finely divided binding material including silicate of soda solution in a gaseous atmosphere, depositing the suspended admixture in successive increments on a moving support until a layer or mat of suitable thickness is formed, subjecting the mat to treatment to remove the fluid contents of the binder, and compacting the mat.

23. In a process for the manufacture of matted material containing mineral fibers and a binder, the improvement which consists in melting a mineral material, projecting the melted mineral material into a chamber at high velocity, projecting a binder in finely divided condition into said chamber, collecting said fibers and the interspersed binder on a moving support to form a mat of suitable thickness, advancing the matted material from said chamber, and subjecting it while being advanced to the action of a gaseous medium to cool and harden the binder.

EDWARD R. POWELL.

DISCLAIMER

Re. 19,627.—*Edward R. Powell*, Alexandria, Ind. PROCESS OF MAKING FELTED MINERAL FIBER. Patent dated June 25, 1935. Disclaimer filed May 6, 1941, by the assignee, *Johns-Manville Corporation.*

Hereby enters this disclaimer to claims 1, 2, 7, 8, 11, and 12 of said patent.

[*Official Gazette June 3, 1941.*]